US011856284B2

(12) United States Patent
Gonzalez Morin et al.

(10) Patent No.: US 11,856,284 B2
(45) Date of Patent: Dec. 26, 2023

(54) METHOD OF CONTROLLING A PORTABLE DEVICE AND A PORTABLE DEVICE

(71) Applicant: Telefonaktiebolaget LM Ericsson (publ), Stockholm (SE)

(72) Inventors: Diego Gonzalez Morin, Madrid (ES); José Araújo, Stockholm (SE); AmirHossein Taher Kouhestani, Solna (SE); Ioannis Karagiannis, Kalamata (GR); Ananya Muddukrishna, Enskededalen (SE); Lars Andersson, Solna (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 69 days.

(21) Appl. No.: 17/604,107

(22) PCT Filed: Apr. 18, 2019

(86) PCT No.: PCT/EP2019/060115
§ 371 (c)(1),
(2) Date: Oct. 15, 2021

(87) PCT Pub. No.: WO2020/211944
PCT Pub. Date: Oct. 22, 2020

(65) Prior Publication Data
US 2022/0224813 A1     Jul. 14, 2022

(51) Int. Cl.
*H04N 23/60* (2023.01)
*G01C 21/00* (2006.01)
(Continued)

(52) U.S. Cl.
CPC ............. *H04N 23/60* (2023.01); *G01C 11/12* (2013.01); *G01C 21/3804* (2020.08);
(Continued)

(58) Field of Classification Search
CPC ........ H04N 23/60; H04N 23/45; G01C 11/12; G01C 21/3804; G01C 11/06;
(Continued)

(56) References Cited

U.S. PATENT DOCUMENTS

2014/0125700 A1* 5/2014 Ramachandran ...... G09G 5/377
345/633

FOREIGN PATENT DOCUMENTS

EP          2915137 A1    9/2015
WO     2017117675 A1    7/2017

OTHER PUBLICATIONS

Chakravarthula, Praneeth, "FocusAR: Auto-focus Augmented Reality Eyeglasses for both Real World and Virtual Imagery", IEEE Transactions on Visualization and Computer Graphics, vol. 24, No. 11, Nov. 2018, 2906-2916.

(Continued)

*Primary Examiner* — Stephen P Coleman
(74) *Attorney, Agent, or Firm* — Murphy, Bilak & Homiller, PLLC

(57) ABSTRACT

A method (100) of controlling a portable device comprising a first camera and a second camera facing in the same direction. The method comprises: selecting (110) one of the first camera and the second camera as a visualization camera; initializing (120) a localization algorithm having as an input image data representing images captured by one of the first camera and the second camera; determining (130) a respective focus score for at least one of the first camera and the second camera, said focus score indicating a focus quality of features identified from images captured by one of the respective camera; selecting (140,) one of the first camera and the second camera as an enabled camera based on the at least one focus score; and generating a control signal configured to cause the selected camera to be enabled (Continued)

such that the image data representing images captured by the enabled camera are provided as the input to the localization algorithm.

14 Claims, 6 Drawing Sheets

(51) Int. Cl.
   *G01C 11/12* (2006.01)
   *G06T 7/00* (2017.01)
   *H04N 23/45* (2023.01)
(52) U.S. Cl.
   CPC ............ *G06T 7/0002* (2013.01); *H04N 23/45* (2023.01); *G06T 2207/30168* (2013.01)
(58) Field of Classification Search
   CPC ......... G06T 7/0002; G06T 2207/30168; G06T 2207/10016; G06T 2207/30244; G06T 7/246; G06T 7/579; G06T 7/73; G06V 20/10
   USPC ...................................... 348/222.1
   See application file for complete search history.

(56) References Cited

OTHER PUBLICATIONS

Giffgaff, "How does autofocus work on your smartphone?", Blog, https://www.giffgaff.com/blog/how-does-auto-focus-work-on-your-smartphone/, Aug. 16, 2019, 1-12.

Lee, Hee Seok, et al., "Simultaneous Localization, Mapping and Deblurring", 2011 IEEE International Conference on Computer Vision, 2011, 1203-1210.

Mur-Artal, Raul, et al., "ORB-SLAM: A Versatile and Accurate Monocular SLAM System", IEEE Transactions on Robotics, 2015, 1-17.

Quan, Meixiang, "Accurate Monocular Visual-inertial SLAM using a Map-assisted EKF Approach", arXiv:1706.03648v3 [cs.RO], Mar. 31, 2018, 1-12.

Xu, Xin, et al., "Robust Automatic Focus Algorithm for Low Contrast Images Using a New Contrast Measure", Sensors, vol. 11, 2011, 8281-8294.

Yang, Shaowu, et al., "Visual SLAM for Autonomous MAVs with Dual Cameras", Proceedings—IEEE International Conference on Robotics and Automation, Jun. 2014, 1-7.

Zhang, Guangcong, et al., "Good Features to Track for Visual SLAM", Computer Vision Foundation, Open Access version, 2015, 1373-1382.

\* cited by examiner

METHOD OF CONTROLLING A PORTABLE DEVICE AND A PORTABLE DEVICE

TECHNICAL FIELD

The invention relates to a method of controlling a portable device comprising first and second cameras. The invention further relates to a portable device and to a system comprising a server and a portable device.

BACKGROUND

Mixed Reality, MR, augmented reality, AR, and Virtual Reality, VR are ground-breaking technologies whose popularity is increasing considerably. The first MR/AR/VR devices were very expensive and not intended for a commercial use (for example, Hololens by Microsoft or the first Oculus Rift). However, the number of new start-ups or big companies developing new MR applications or selling affordable mounted head displays (for example, Holokit) for smartphones is raising rapidly. Furthermore, the newest smartphones are being produced with embedded hardware artificial intelligence, AI, capabilities to enhance the AR experiences.

One of the common features of the MR/AR/VR devices is the application of Simultaneous Localization and Mapping, SLAM, algorithms. A SLAM algorithm enables the position and orientation of the device in the real 3D space to be estimated by tracking features identified from sensor data available to the device. The SLAM algorithm may also generate a map of the device's surroundings, including for example a representation of the identified features at their relative positions. In standalone MR/AR/VR headsets, multiple cameras and depth/range sensors are used, which allow robust SLAM to be performed. However, current smartphone-based MR/AR/VR applications typically rely only upon a rear camera and an Inertial Measurement Unit, IMU, to provide input to the SLAM algorithm. The precision of position tracking and mapping can decrease when either the environmental conditions or the camera settings are not optimal, for example when used in low levels of lightning, when the camera is not optimally focused, or when the camera is experiencing fast movements. This can affect the MR/AR/VR user experience considerably, in particular when virtual content is intended to be anchored to the features detected by the SLAM algorithm and the reduced SLAM performance causes virtual content erroneously to move relative to the real world.

The way that SLAM systems utilize information from a received image defines them as either direct or indirect SLAM. Indirect SLAM systems attempt to identify features first, and then make use of those features to locate the camera and build a map. In the case of an indirect SLAM algorithm, features can be simple geometric features such as corners or edges, or more sophisticated feature descriptors, for example SIFT, ORB, or FAST. An indirect, visual-inertial SLAM method is described in Meixiang Quan et al, "Accurate Monocular Visual-inertial SLAM using a Map-assisted EKF Approach", arXiv:1706.03648, 2017. Ra'ul Mur-Artal et al "ORB-SLAM: a Versatile and Accurate Monocular SLAM System", IEEE Transactions on Robotics, Volume 31, Issue 5, October 2015 illustrates ORB SLAM, which is a widely used visual indirect SLAM algorithm, which relies on the detection and tracking of ORB features.

Direct methods identify features comprising, for example, visual patterns and structures defined simply by differences in pixel intensity within a region of an image captured by a camera. Direct methods try to recover the depth and structure of the environment and the camera pose by performing an optimisation on the map and camera parameters together. As the indirect feature identification procedure can take more time than direct feature identification, direct methods potentially allow more time for other computations while maintaining the same frame rate as indirect methods. On the other hand, indirect feature-based methods provide better tolerance towards changing lighting conditions since, unlike direct methods, they are not using the pixel intensities directly. Recently, there have been proposals of a hybrid SLAM merging ideas from direct and indirect SLAM, as for example the SVO SLAM.

A problem faced by smartphone SLAM algorithms is that the position of the smartphone and the virtual content can drift by several centimetres during times when the camera performs a change of focus. A solution to this problem is to disable the autofocus of the camera and set the focus to a fixed value. However, in MR applications, a user may want to get very close to real objects or a user's hands may move towards the camera when they interact with the virtual content and a change of focus is required. In these scenarios, the image can be blurry as the focus is not adequate for these short distances. This blurriness in the camera feed to the SLAM algorithm leads to a worse SLAM performance and a worse user experience.

Another solution is to apply deblurring algorithms to the images input into the SLAM algorithm in order to remove the blur from the images before they are used in the SLAM algorithm; see for example Hee Seok Lee et al, "Simultaneous Localization, Mapping and Deblurring", ICCV '11 Proceedings of the 2011 International Conference on Computer Vision, pages 1203-1210. These deblurring algorithms are directed to camera movement blurriness, but similar algorithms could be used for blurriness that arises during camera autofocus. Even though the results confirm that these techniques enhance the features of the blurry images, the output deblurred images are not as natural as a normal "in focus" image because the deblurring algorithms add artefacts to the image. If de-blurred images are used for visualizing MR, the visualization stream might not look good, decreasing the user experience in smartphone-based AR applications. Furthermore, deblurring algorithms are normally computationally expensive to apply.

SUMMARY

It is an object to provide an improved method of controlling a portable device comprising a first camera and a second camera facing in the same direction. It is a further object to provide an improved portable device. It is a further object to provide an improved system comprising a server and a portable device.

An aspect of the invention provides a method of controlling a portable device comprising a first camera and a second camera facing in the same direction. The method comprises selecting one of the first camera and the second camera as a visualization camera. The method comprises initializing a localization algorithm having as an input image data representing images captured by one of the first camera and the second camera. The method comprises determining a respective focus score for at least one of the first camera and the second camera. The focus score indicates a focus quality of features identified from images captured by the respective camera. The method comprises selecting one of the first camera and the second camera as an enabled camera based on the at least one focus score. The method comprises generating a control signal configured to cause the selected camera to be enabled such that the image data representing images captured by the enabled camera are provided as the input to the localization algorithm.

By considering both cameras, the method may enable robust localization algorithm implementation. To ensure a good user experience, the camera that is used for visualization is fixed.

In an embodiment, the method further comprises determining that the enabled camera requires a change of focus and changing to the other of the first camera and the second camera being the enabled camera based on the respective focus scores of the first camera and the second camera.

This enables a robust localization algorithm implementation when the focus of the camera being used to feed the algorithm needs to be changed. By enabling switching between cameras, the camera that is chosen to be used to feed the localization algorithm will be the one with better focus conditions in each time step. This enables the user experience to be preserved while focus changes are carried out. Furthermore, because only one camera is used to provide the input to the localization algorithm at any one time, the robustness of the algorithm can be improved without significantly increasing the computing power and resources required.

In an embodiment, the method further comprises, after deselecting said one of the first camera and the second camera as the enabled camera, changing the focus of said camera so that a desired focus score is achieved for said camera. The enabled camera does not change its focus while it is in use, so there will eventually be a need to change back to the other, currently non-enabled, camera. This process is most efficient if the currently non-enabled camera is ready and while disabled, improves its focus score In an embodiment, determining that the enabled camera requires a change of focus comprises one of: determining that the focus score of the enabled camera is less than a focus score threshold value; and the localization algorithm predicting that a change of focus is required. The method may enable an optimized scheduled switching between the cameras to ensure localization algorithm robustness when a change of focus is needed.

In an embodiment, where the portable device comprises a display and the images captured by the visualization camera are displayed on the display, the method comprises determining a visualization focus, VF, score for the visualization camera. The VF score indicates a focus quality of the images captured by the visualization camera. Determining that the enabled camera requires a change of focus comprises determining that the VF score is less than a VF threshold value. The method may enable an optimized scheduled switching between the cameras to ensure localization algorithm robustness when a change of focus of the visualization camera is needed, to maintain a good user experience.

In an embodiment, the localization algorithm is a localization and mapping algorithm. The method comprises identifying features in the image data representing images captured by the first camera and identifying features in the image data representing images captured by the second camera. The method further comprises determining respective location information for said features. The method further comprises generating a map of the environment in which the mobile device is located. The map is a common map and the map is built using the respective location information for the features identified from the images captured by each of the first camera and the second camera.

Generating a common map advantageously increases the robustness of the localization algorithm because the features space is more coarse as it includes features from both cameras. It also ensures that the portable device always has a map with enough features to localize itself.

In an embodiment, the common map is built by generating a map for the first camera and by transposing into said map features identified from image data representing images captured by the second camera when the second camera is the enabled camera. This is less memory and computationally consuming than having to update two different maps.

In an embodiment, the common map is built by generating a first map for the first camera and generating a second map for the second camera, and transposing features from one of the first map and the second map into the other of the first map and the second map. This may ensure that the portable device always has a map with enough features to localize itself.

In an embodiment, the method comprises identifying features in the image data representing images captured by the first camera and identifying features in the image data representing images captured by the second camera. The focus scores are determined based on at least one of: a change in a number of features identified from the images captured by the respective camera; an uncertainty value of the features identified from images captured by the respective camera; the quality of the features identified from images captured by the respective camera; and a ratio of a number of dynamic features to a number of static features identified from the images captured by the respective camera.

In an embodiment, the method comprises determining a visualization focus, VF, score for the respective camera. The VF score indicates a focus quality of the images captured by the respective camera. The focus score is combined with the VF score to provide a final focus score for the respective camera. The final focus score therefore takes account of both the performance of the localization algorithm and the general blurriness of the images captured by the respective camera.

In an embodiment, respective focus scores for the first camera and the second camera are determined periodically, at the same rate. The rate should be smaller than a rate at which images are captured by the respective cameras, but sufficiently high rapidly to detect the need for and make focus changes.

In an embodiment, the respective focus scores are determined consecutively, periodically, at the same rate. This may ensure that determining the focus scores does not become overly computationally heavy.

In an embodiment, the focus score for the enabled camera is determined periodically. The focus score for the other of the first camera and the second camera is determined when the focus score for the enabled camera is below a focus score acceptability threshold. This may ensure that determining the focus scores does not become overly computationally heavy.

In an embodiment, the one of the first camera and the second camera having a higher focus score is selected as the enabled camera. This may increase robustness of the localization algorithm as the better prepared camera will be used.

In an embodiment, one of the first camera and the second camera is a preferred camera. The method further comprises changing to the preferred camera when the focus score of the preferred camera is higher than the focus score of the other of the first camera and the second camera. The camera having the better camera parameters, such as such as power consumption, resolution, and field of view, can therefore be used in preference to the other camera and the method will always try to switch back to using the preferred camera.

In an embodiment, where the portable device comprises a display and the images captured by the visualization camera are displayed on the display, the method further comprises determining a visualization focus, VF, score for the visualization camera. The VF score indicates a focus quality of the images captured by the visualization camera. Changing to the other camera occurs if at least one of the following conditions are met: the other camera is not the visualization camera; and the VF score of the visualization camera is above a VF threshold. This enables the method to give a higher priority to a correct visualization of the real world over the performance of the localization algorithm.

In an embodiment, one of the first camera and the second camera has a fixed focus. The focus of the other one of the first camera and the second camera can be changed. The focus of one camera will therefore be the same the whole time, whether the camera is enabled or disabled. By doing this, the localization algorithm can be performed using one camera and always has the same performance, so features detected by the algorithm will be robust over time. This may allow the other camera to perform changes of focus and provide a better visualization stream to the portable device while ensuring robustness of feature tracking by performing short switches to the fixed focus camera. This may be particularly advantageous when the portable device is a smartphone arranged for AR/Visualization applications.

In an embodiment, the localization algorithm is one of a location and mapping algorithm and a structure from motion algorithm. The method is thus applicable to the problem of building a 3D model of the environment and localizing the portable device within the environment.

In an embodiment, the localization algorithm is a simultaneous location and mapping, SLAM, algorithm.

In an embodiment, the portable device is one of a computing device, a smart phone, a portable phone, a cell phone, a wireless device, a wireless camera, a gaming console or device, a tablet, a laptop, a head-mounted device, a navigation device and a robotic device.

In an embodiment, the portable device further comprises a display. The method further comprises a step of generating a control signal configured to cause the images captured by the visualization camera to be displayed on the display. The control signal may also be configured to cause virtual content to be displayed with the images.

When virtual content and the real world are visualized through the device's camera, only one camera should be used for visualization to ensure a proper AR user experience and avoid incoherencies.

Corresponding embodiments apply equally to the portable devices and to the system described below.

An aspect of the invention provides a portable device comprising a first camera, a second camera and processing circuitry. The first camera and the second camera face in the same direction. The processing circuitry is configured to cause the portable device to select one of the first camera and the second camera as a visualization camera. The processing circuitry is configured to cause the portable device to initialize a localization algorithm having as an input image data representing images captured by one of the first camera and the second camera. The processing circuitry is configured to cause the portable device to determine a respective focus score for at least one of the first camera and the second camera. The focus score indicates a focus quality of features identified from images captured by the respective camera. The processing circuitry is configured to cause the portable device to select one of the first camera and the second camera as an enabled camera based on the at least one focus score. The processing circuitry is configured to cause the portable device to generate a control signal configured to cause the selected camera to be enabled such that the image data representing images captured by the enabled camera are provided as the input to the localization algorithm.

An aspect of the invention provides a system comprising a server and a portable device. The server comprises processing circuitry and interface circuitry. The portable device comprises a first camera, a second camera, processing circuitry and interface circuitry. The first camera and the second camera face in the same direction. The processing circuitry of the server and the processing circuitry of the portable device are together configured to cause the system to: select one of the first camera and the second camera as a visualization camera; initialize a localization algorithm having as an input image data representing images captured by one of the first camera and the second camera; determine a respective focus score for at least one of the first camera and the second camera; select one of the first camera and the second camera as an enabled camera based on the at least one focus score; and generate a control signal configured to cause the selected camera to be enabled such that the image data representing images captured by the enabled camera are provided as the input to the localization algorithm. The focus score indicates a focus quality of features identified from images captured by the respective camera.

An aspect of the invention provides a portable device comprising, a first camera, a second camera, interface circuitry and processing circuitry. The first camera and the second camera face in the same direction. The processing circuitry is configured to cause the mobile device to: select one of the first camera and the second camera as a visualization camera; initialize a localization algorithm having as an input image data representing images captured by one of the first camera and the second camera; determine respective a focus score for at least one of the first camera and the second camera, said focus score indicating a focus quality of features identified from images captured by the respective camera; select one of the first camera and the second camera as an enabled camera based on the at least one focus score; and generate a control signal configured to cause the selected camera to be enabled such that the image data representing images captured by the enabled camera are provided as the input to the localization algorithm.

An aspect of the invention provides a computer program, comprising instructions which, when executed on at least one processor, cause the at least one processor to carry out any of the above steps of the method of controlling a portable device.

An aspect of the invention provides a data carrier having computer readable instructions embodied therein. The said computer readable instructions are for providing access to resources available on a processor. The computer readable instructions comprise instructions to cause the processor to perform any of the above steps of the method of controlling a portable device.

In an embodiment, the data carrier is a non-transitory data carrier.

Embodiments of the invention will now be described, by way of example only, with reference to the accompanying drawings.

DETAILED DESCRIPTION

The same reference numbers will used for corresponding features in different embodiments.

Figure 1:
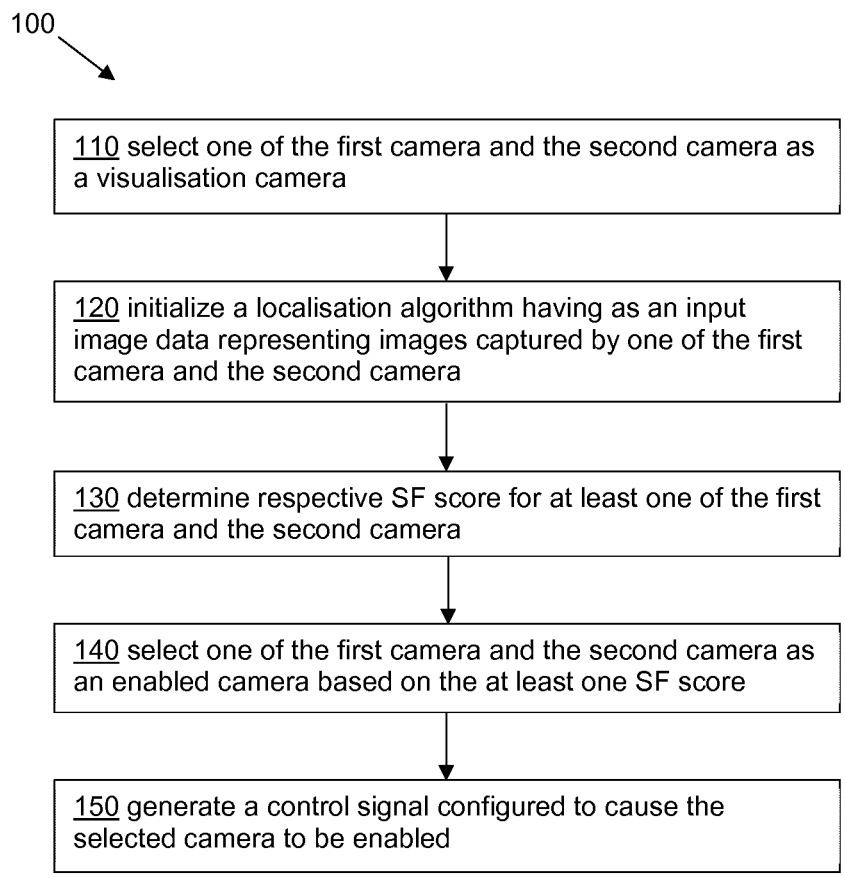
FIGS. 1 to 3 are flowcharts illustrating method steps of embodiments of the invention.

Referring to FIG. 1, an embodiment of the invention provides a method of controlling a portable device comprising a first camera and a second camera. The first and second camera face in the same direction.

The method comprises steps of:
- selecting 110 one of the first camera and the second camera as a visualization camera;
- initializing 120 a localization algorithm having as an input image data representing images captured by one of the first camera and the second camera;
- determining 130 a respective focus score for at least one of the first camera and the second camera;
- selecting 140 one of the first camera and the second camera as an enabled camera based on the at least one focus score; and
- generating a control signal configured to cause the selected camera to be enabled such that the image data representing images captured by the enabled camera are provided as the input to the localization algorithm.

The focus score indicates a focus quality of features identified from images captured by the respective camera. The focus score is a quality measurement of the "in focus" level in terms of the localization algorithm performance. For instance, if the localization algorithm determines that the main features being tracked are becoming blurry, this score would decrease, and vice versa.

The enabled camera is the camera whose feed forms the input to the localization algorithm and is used for the localization algorithm computations. The other camera is the non-enabled/disabled camera, whose feed is not input to the localization algorithm.

Image data may be output by, or derived from, data output by the camera. The image data may comprise image frames, each image frame comprising pixel intensity data at a point in time for the pixels of an image sensor in the camera. A focus area comprises one or more areas within an image in which the image content has the highest level of sharpness. Out-of-focus areas are the complementary areas to focus areas in an image. The process of moving the focal plane of the camera forward and backward is called focusing, focus adaptation or a change of focus.

The portable device may for example be any one of a computing device, a smart phone, a mobile phone, a cell phone, a wireless device, a wireless camera, a gaming console or device, a tablet, a laptop, a head-mounted device, a navigation device and a robotic device.

In an embodiment, the portable device comprises a display and the method further comprises a step of generating a control signal configured to cause the images captured by the visualization camera to be displayed on the display. The control signal may also be configured to cause virtual content to be displayed with the images.

In an embodiment, the localization algorithm is a location and mapping algorithm, which may be a simultaneous localization and mapping, SLAM, algorithm.

Alternatively, the localization algorithm may be a structure from motion algorithm. Either option is applicable to solving the problem of building a 3D model of the environment and localizing the portable device within the environment.

The localization algorithm may be a direct localization algorithm, identifying and tracking movement of features comprising luminance/chrominance patterns. Alternatively, the localization algorithm may be an in-direct localization algorithm, identifying and tracking movement of features comprising geometric patterns and features such as corners and edges, or more sophisticated feature descriptors such as SIFT, ORB, and FAST, as described, for example, in Ra'ul Mur-Artal et al "*ORB-SLAM: a Versatile and Accurate Monocular SLAM System*", IEEE Transactions on Robotics, Volume: 31, Issue: 5, October 2015, pages 1147-1163, "Feature Choice" and "ORB Extraction".

In an embodiment, the method further comprises determining that the enabled camera requires a change of focus. In response to this, there is a change to the other of the first camera and the second camera being the enabled camera, based on the respective focus scores of the first camera and the second camera. A change of focus of a camera comprises performing an operation which adjusts the focal plane of the camera, so that a desired area of interest becomes in focus.

In an embodiment, after a camera is disabled, i.e. after a camera is deselected as the enabled camera, the focus of the disabled camera may be adjusted so that one or more features within an image area of interest captured by the disabled camera are in focus. Once a camera has been disabled, functionality may be triggered to try to adjust its focus to maximise its focus score. The enabled camera cannot change focus during use, so it will eventually be necessary to change back to the other camera, i.e. reselect the currently disabled camera as the enabled camera. This process is most efficient if the disabled camera is brought into focus or at least adjusted so as to improve its focus score while disabled. The disabled camera will then be ready for re-selection. The method may comprise executing an autofocus algorithm to adjust the focus of the disabled camera and bring it into focus for a specified focus area of an image.

In an embodiment, determining that the enabled camera requires a change of focus comprises determining that the focus score of the enabled camera is less than a focus score threshold value. Alternatively, the localization algorithm may predict that a change of focus is required.

In an embodiment, where the portable device comprises a display and the images captured by the visualization camera are displayed on the display, the method further comprises determining a visualization focus, VF, score for the visualization camera. This is particularly useful where the portable device is also arranged to cause virtual content to be displayed with the images, to provide an augmented reality, AR, experience to a user. Determining that the enabled camera requires a change of focus comprises determining that the VF score is less than a VF threshold value. The VF score indicates a focus quality of the images captured by the visualization camera. The VF score is a measure of the focus quality of the visualization stream, i.e. the images output by the visualization camera. The VF score is maximized when the images are sharp, and the main objects in a captured scene are well represented. For instance, if the scene includes a moving hand, the hand should be correctly represented while the background would get blurry. It would be the equivalent to using the autofocus in a smartphone camera. A high VF score does not imply a high focus score and the scores are not necessarily correlated. For example, in the case of moving hand capture by the camera, the visualization camera will try to maximize the sharpness and quality in the representation of the hand. However, even though this would lead to a high VF score, the background would be out of focus and blurry causing a poor localization algorithm performance and low focus score if the image data representing the images captured by the camera are being provided as the input to the localization algorithm.

In an embodiment, the method further comprises determining a visualization focus, VF, score for a respective camera. The focus score of the camera may be combined with the VF score of the camera to provide a final focus score for the camera.

In an embodiment, the localization algorithm is a localization and mapping algorithm. The method comprises identifying features in image data representing images captured by the first camera and identifying features in image data representing images captured by the second camera. Respective location information is also determined for the identified features. Using the localization and mapping algorithm, a map is generated of the environment in which the portable device is located. The map is a common map built using the location information for the features identified from the images captured by each of the first camera and the second camera.

In an embodiment, the common map is built by initially generating a map for the first camera. Features identified from image data representing images captured by the second camera, when the second camera is the enabled camera, are then transposed into the map.

Alternatively, the common map may be built by generating a first map for the first camera and generating a second map for the second camera. Features from one of the maps are then transposed into the other map, which forms the common map.

In an embodiment, the method comprises identifying features in the image data representing images captured by the first camera and identifying features in the image data representing images captured by the second camera. Focus scores are then determined for each camera. The focus scores can be determined based on one or more of the following: a change in a number of features identified from the images captured by the respective camera; an uncertainty value of the features identified from images captured by the respective camera; the quality of the features identified from images captured by the respective camera; and a ratio of a number of dynamic features to a number of static features identified from the images captured by the respective camera.

In an embodiment, respective focus scores for the first camera and the second camera are determined periodically, at the same rate.

In an embodiment, the focus score for the enabled camera is determined periodically. The focus score for the disabled camera is determined when the focus score for the enabled camera is below a focus score acceptability threshold.

In an embodiment, the one of the first camera and the second camera having a higher focus score is selected as the enabled camera.

In an embodiment, one of the first camera and the second camera is a preferred camera. The method comprises changing to the preferred camera when the focus score of the preferred camera is higher than the focus score of the disabled camera.

In an embodiment, where the portable device comprises a display and the images captured by the visualization camera are displayed on the display, the method further comprises determining a visualization focus, VF, score for the visualization camera. Changing to the other camera, i.e. the disabled camera, occurs if at least one of the following conditions are met: the disabled camera is not the visualization camera; and the VF score of the visualization camera is above a VF threshold.

In an embodiment, one of the first camera and the second camera has a fixed focus. The focus of the other one of the first camera and the second camera can be changed.

Figure 2:
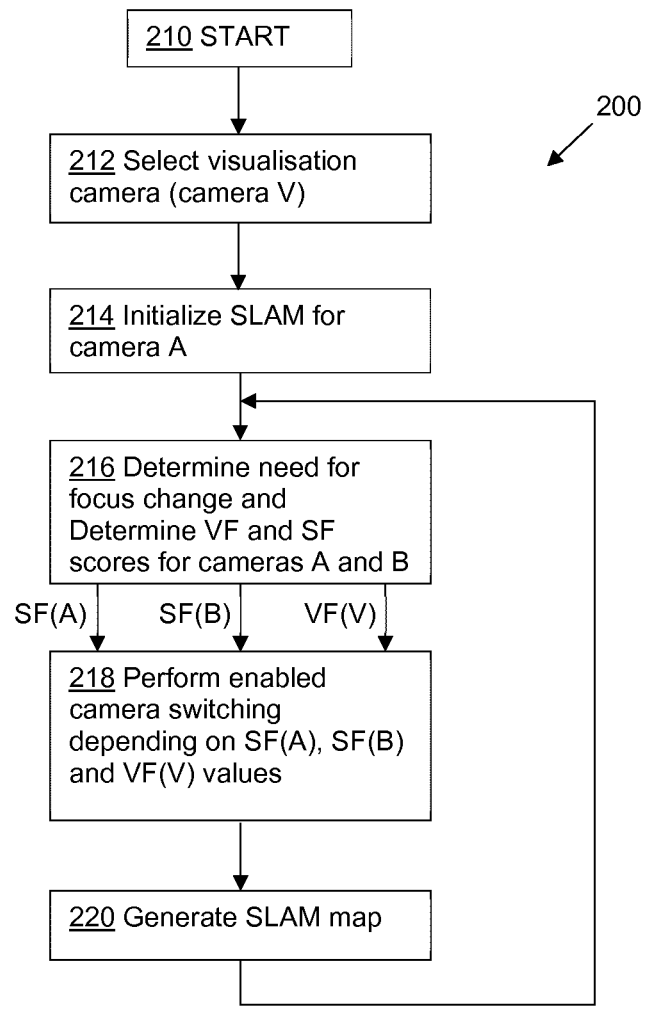

Referring to FIG. 2, embodiments of the invention provides a method 200 of controlling a portable device, such as a smart phone, having a first camera, A, and second camera, B, each having autofocus capabilities. The portable device also comprises a display.

In this embodiment, the localization algorithm is a simultaneous localization and mapping, SLAM, algorithm.

The method 200 comprises the following steps:
1) Select 212 one of camera A and camera B as the visualization camera which generates video input to be used for MR visualization on the display
2) Initialize 214 the SLAM algorithm using one of camera A and camera B
3) Determine 216 the visualization focus, VF, and SLAM focus, SF, score for camera A and camera B
4) Select 218 one of cameras A and B to provide the video input to be used by the SLAM algorithm, based on the determined SF scores of the cameras
5) Generate 220 a common map of the environment of the portable device The method 200 provides a light alternative to dual camera SLAM in which SLAM is performed using the video input from two or more cameras simultaneously. The method enables an increase in the robustness of SLAM algorithms used in portable devices, without significantly increasing required power consumption and processing resources.

The method performs an automatic real-time switching between two cameras of a portable device to improve the robustness of the state estimation and mapping of the SLAM algorithm. Therefore, only one camera will be used to generate the video input to be fed to the SLAM algorithm in each iteration of the algorithm.

The method switches between using camera A and B as the input to the SLAM algorithm, depending of the SF scores. The Visualization camera, V, can be camera A or camera B, but the selection is fixed while the method is implemented.

The method 200 may be configured to operate in two different ways: no preferred camera; and preferred camera. If there is no preferred camera, the only switching criteria is the SF scores of the cameras. Neither of the cameras has any preference over the other, regardless the camera parameters. In the case where there is a preferred camera, one camera, in this example camera A, is chosen as the preferred one, and the method will always try to switch back to using this camera as the enabled camera.

Each of the above steps will now be described in more detail, with various associated embodiments.

Step 1) Select One of Camera A and Camera B as the Visualization Camera which Generates Video Input to be Used for MR Visualization.

In AR, virtual content is overlaid on top of images of the real world. An important step performed by the SLAM algorithm is deciding how this virtual content is placed. The map/s built by the SLAM algorithm serve to estimate the position/orientation of the portable device. However, in the case where the virtual content and real-world content are visualized through a smartphone's camera, only one camera should be used for visualization. This is done to ensure a proper AR experience and avoid incoherencies.

In an embodiment, the visualization camera, V, is chosen according to the visualization suitability of the camera parameters, such as field of view, brightness, maximum focal length, aperture, of each of camera A and camera B.

In an embodiment, the camera that was not selected for SLAM algorithm initialization is selected as the visualization camera. This option is particularly suitable for the preferred camera case as, in this way, the method will try to optimize the SF score of camera A and optimize the VF score of camera BN.

Step 2) Initialize the SLAM Algorithm Using One of the Cameras.

In an embodiment, where there is no preferred camera, the current status of each camera, blurriness level, lighting, and focus, is measured and the statuses are compared. A score is given to each camera depending on at least some of these parameters and the camera having the highest score is chosen for SLAM initialization. For example, if during the initialization step camera A is out of focus, the method will initially enable camera B and disable camera A.

In an embodiment, where there is a preferred camera, one of the cameras is chosen at the preferred camera based on the cameras' parameters, such as power consumption, resolution, and field of view. The preferred camera is then used for the SLAM algorithm initialization. In this example, camera A is chosen as the preferred camera.

Step 3) Determine the Visualization Focus, VF, and SLAM Focus, SF, Score for Camera A and Camera B.

The VF score is only estimated for camera V, as it is the only camera used for visualization. The VF score can be estimated for every video frame for the images captured by camera V, as the video feed from the camera V is continuous.

In an embodiment, the VF score for the video feed from camera V feed is determined. An "in focus" image has bigger colour gradients and sharper features. Therefore, an algorithm that measures these parameters and determines an in-focus score based on them can be used to determine the VF score. For example, an Automatic Focus Algorithm may be used, as described in Xin Xu et al "Robust Automatic Focus Algorithm for Low Contrast Images Using a New Contrast Measure", Sensors, vol. 11, pages 8281-8294, 2011.

In an embodiment, the smartphone API provides a method to read, in real-time, the VF score for camera V.

In an embodiment, a change of focus request for camera V is raised if the VF score is determined to be below a VF threshold.

In an embodiment, the SF is measured by the SLAM algorithm in one of several ways: the gradient in the number of detected features; the value of internal uncertainties; the general quality of the features identified from the image data representing the images captured by the respective camera.

In an embodiment, the need for a change of focus of the enabled camera is predicted by the SLAM algorithm based on an estimation of the position/orientation and velocity of the portable device and a geometrical representation, such as a point cloud or mesh, of the real-world scene, which are calculated by the SLAM algorithm. The method 200 may therefore comprise making a prediction for the next X ms, determine when the change of focus should be performed and implement the change of focus at the predicted required time, with no time delay.

An increment or decrement in the number of dynamic features (usually discarded by the SLAM algorithms) identified in the image data may be caused by a low SF score. For instance, if a moving hand appears in the real-world scene captured by a camera, background features in the scene might become blurry and the hand features sharper, as the autofocus of the camera attempts to focus on the hand. This would decrease the SLAM performance as the highest quality features available to the SLAM algorithm would be dynamic features, which are not useful for the SLAM algorithm. In an embodiment, a change of focus of the camera is made so that the background features get sharper, to improve the SLAM performance. The ratio of the number of dynamic features to the number of static features is used to calculate the SF score.

In an embodiment, the general blurriness is additionally taken into account in determining the SF score for a camera. A final SF score is given by the SF score combined with a VF score for the camera. In order to get the final SF score, a weighted score may be used:

$$SF = \gamma SF_{SLAM} + (1-\gamma)VF(\text{Current Camera})$$

In an embodiment, the SF score for the disabled camera is determined using N frames previously received from that camera, where N is a minimum number of frames necessary to estimate SF for the disabled camera or a predefined maximum number of frames which should be considered. A maximum number of frames may be set to ensure fast camera switches.

In another embodiment, the enabled camera raises a change of focus request if its SF score is below an SF threshold.

Scheduling for acquiring or measuring SF scores can be determined as follows.

In an embodiment, where there is no preferred camera, the SF scores of both cameras are measured at the same rate. To avoid overloading the processing circuitry of the portable device, this is done not in parallel but consecutively. The rate should be smaller than the image capture rate, but sufficiently high to enable changes of focus to be rapidly made.

In an embodiment, where there is no preferred camera, the SF score of the enabled camera is constantly determined and the SF score of the disabled camera is only determined when the SF score of the enabled camera is not acceptable or is below an SF threshold.

In an embodiment, where there is a preferred camera, for example, camera the SF score of the non-preferred camera, for example camera B, is checked only when the SF score of the preferred camera is low. If the non-preferred camera has a better SF score in that time step iteration of the SLAM algorithm, then the method switches cameras, i.e. selects the currently disabled camera, camera B, as the enabled camera.

In an embodiment, where there is a preferred camera, when the focus score of the preferred camera, for example camera A, decreases below an SF threshold, the disabled camera, camera B, is enabled and the SF scores of both cameras are determined simultaneously. A change of enabled camera happens only if camera A's SF score decreases below a lower threshold to the previously defined SF threshold and the camera B SF score is higher. By doing this, the method ensures that the disabled camera is prepared for a possible switch.

In an embodiment, even if the disabled camera, for example camera B, has a better SF score, the method only selects the disabled camera as the enabled camera, i.e. switches cameras, if the currently disabled camera is not the visualization camera, camera V, or if the VF score of the currently disabled camera is also above a VF threshold. This step is added if it is preferred to give preference to the visualization than to the SLAM algorithm.

In an embodiment, where the portable device is a smartphone, the smartphone API may invoke a call-back when the smart phone's autofocus algorithm requires a focus change in one of the cameras, both depending on the SF score and the VF score. If an autofocus request for one of the cameras is invoked by the API then that camera's SF or VF score is set to low. The SF or VF is set as high once the change of camera has been completed and that camera has finished performing a change of focus.

Step 4) Select One of Cameras A and B to Provide the Video Input to be Used by the SLAM Algorithm, Based on the Determined SF Scores of the Cameras The purpose of this step is to decide and control when to switch cameras, i.e. when to change from one camera being the enabled camera to the other camera being the enabled camera.

In an embodiment, where there is no preferred camera, the method automatically switches to the camera that has the better SF score. In the case that good visualization of the real world has a higher priority than good performance of the SLAM algorithm, selecting the currently disabled camera as the enabled camera, i.e. a camera switch, is only performed if the disabled camera is not camera V or if the disabled camera's VF score is above a VF threshold. This is done because if the VF score of camera V is low, a change of focus will be triggered and the SF score of the disabled camera will therefore change, and the previously calculated SF score will no longer be true, and the SLAM algorithm may lose robustness.

In an embodiment, where there is no preferred camera, when a camera switch is performed, the focus of the now disabled camera is changed to maximise its focus score. In this way, the disabled camera adapts its focus while it is not being use by the SLAM algorithm.

In an embodiment, where there is a preferred camera, the method re-selects the preferred camera, for example camera A, as the enabled camera as soon as the SF score of the camera A is better than the SF score of the non-preferred camera, camera B. In this case, while the non-preferred camera B is enabled, the SF scores of both cameras are measured. In the case that the correct visualization has a higher priority than the performance of the SLAM algorithm, the preferred camera is only re-selected if the VF score of the preferred camera is above a VF threshold or if the preferred camera is not the visualization camera, camera V. This is done because if the VF score in camera V is low, a change of focus will be triggered and the SF score of the preferred camera will therefore change, and the previously calculated SF score will no longer be true, and the SLAM algorithm may lose robustness.

In an embodiment, where there is a preferred camera, the non-preferred camera has a fixed focus. By doing this, when the SLAM algorithm input is the image data representing images captured by the non-preferred camera, the SLAM algorithm will always have the same performance, and the features detected will be robust over time. This allows the preferred camera to implement changes of focus and have a better AR visualization in the smartphone while ensuring robustness of tracking by performing short switches to the non-preferred camera.

In an embodiment, where there is a preferred camera, if the non-preferred camera is the visualization camera, camera V, the method continuously tries to optimize the SF score of the preferred camera and to optimize the VF score of camera V. Camera V's SF score is only evaluated in the case in which the preferred camera has a low SF score. If the non-preferred camera's SF and VF scores are above their respective thresholds, then the non-preferred camera is enabled, and the preferred camera is disabled. Finally, the preferred camera (now disabled) will perform a focus change.

5) Generate a Common Map of the Environment of the Portable Device

In order to ensure that the robustness of the mapping increases by performing the camera switches, the method performs the following.

A C matrix is created that maps a point in a captured Image (I) with a corresponding point in the real-world coordinate frame (W):

$$P^{\{W\}} = C^{4 \times 3} P^{\{I\}}$$

The C matrix is created using both intrinsic and extrinsic parameters of the cameras. The C matrix is a transformation matrix, with scale, translation and rotation components. The components depend on the intrinsic and extrinsic (relative position and rotation of the cameras with each other) parameters. These parameters are provided by the camera manufacturer or may be obtained through calibration measurements. Once camera matrices C have been created for each camera, they can be used to build a common map using visual features identified from the image data representing images captured by each of the cameras. The C matrix parameters will be fixed, as both the intrinsic and extrinsic parameters are fixed, as long as no zoom in/out is done by the camera. To ensure this, zoom in/out capabilities are disabled. The intrinsic parameters K matrix has the following shape:

$$K = \begin{pmatrix} f_x & s & x_0 \\ 0 & f_y & y_0 \\ 0 & 0 & 1 \end{pmatrix}$$

In an embodiment, where there is no preferred camera, the method comprises building two maps, one for each camera. Features from one map are then mapped into the other map using the C matrices of the cameras, $C_A(f_x, f_y)$ and $C_B(f_x, f_y)$.

In an embodiment, where there is a preferred camera, the method comprises generating a map for one of the cameras, for example camera A, and then mapping features identified in image data representing images captured by the other camera, camera B, are mapped into the camera A map using the C matrices of the cameras, $C_A(f_x, f_y)$ and $C_B(f_x, f_y)$.

Figure 3:
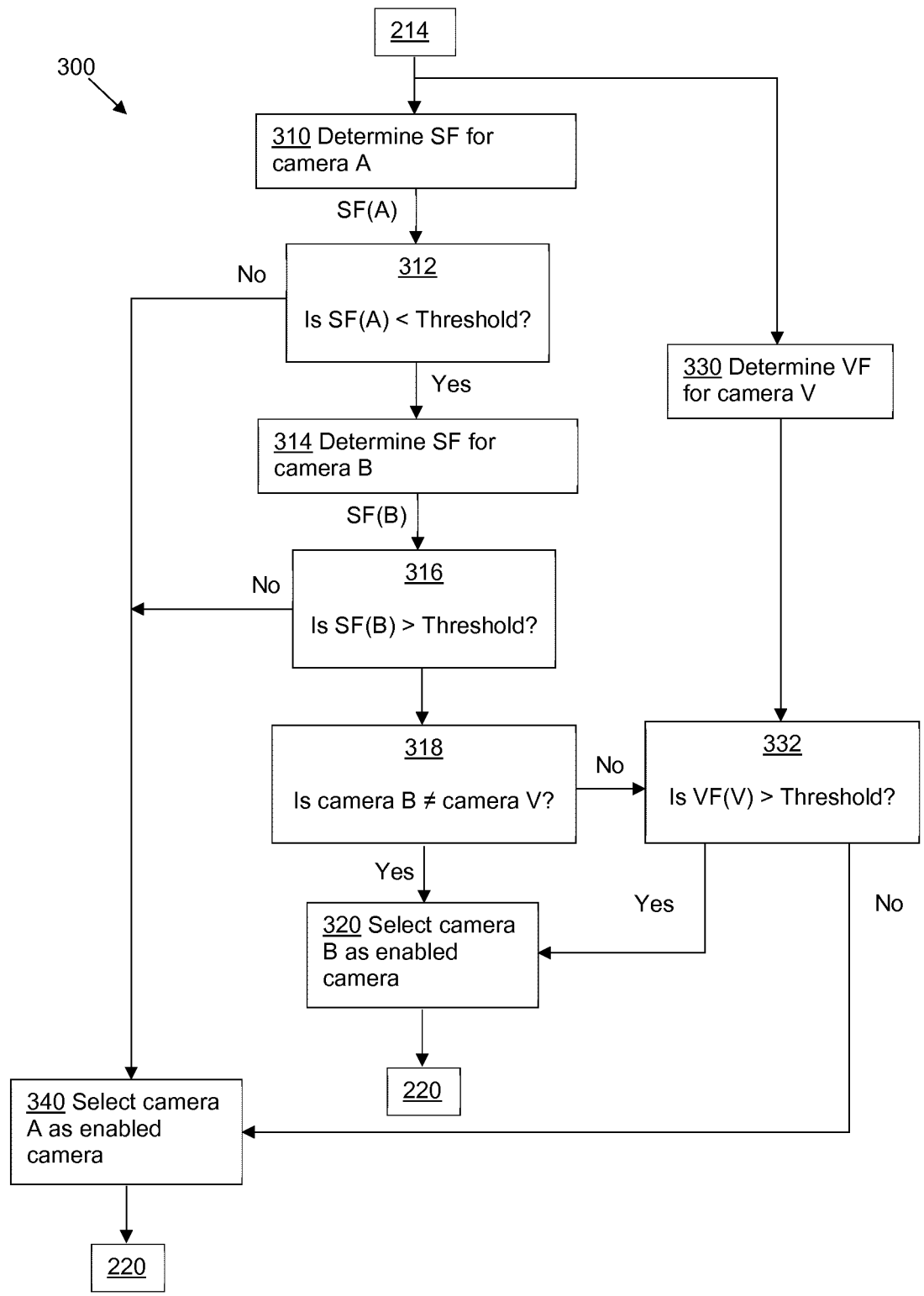

Referring to FIG. 3, an embodiment of the invention provides a method 300 of controlling a portable device, such as a smart phone, having a first camera, A, and second camera, B, each having autofocus capabilities. The portable device also comprises a display.

The method 300 of this embodiment shares step 1), 212, step 2), 214, and step 5), 220 of the method 200 of FIG. 2. Steps 3) and 4) are modified as follows.

Following step 2), the method 300 comprises determining 310 an SF score, SF(A), for camera A. If the SF score of camera A is above an SF threshold 213, the method selects 340 camera A as the enabled camera.

If the SF score of camera A is below the SF threshold 213, the method determines 314 an SF score, SF(B), for camera B. If the SF score of camera B is less than an SF threshold 316, the method selects 340 camera A as the enabled camera.

If the SF score of camera B is above than the SF threshold 316, the method checks 318 whether camera B is not the visualization camera, camera V. If camera B is the visualization camera, the method determines 332 whether the VF score, VF(V), of camera V is above a VF threshold. If VF(V)

is not above the VF threshold, the method selects 340 camera A as the enabled camera. If VF(V) is above the VF threshold, the method selects 320 camera B as the enabled camera.

If camera B is not the visualization camera, the method selects 320 camera B as the enabled camera.

The method 300 then proceeds to generating 220 a SLAM map.

Corresponding embodiments apply equally to the portable devices and to the system described below.

Figure 4:
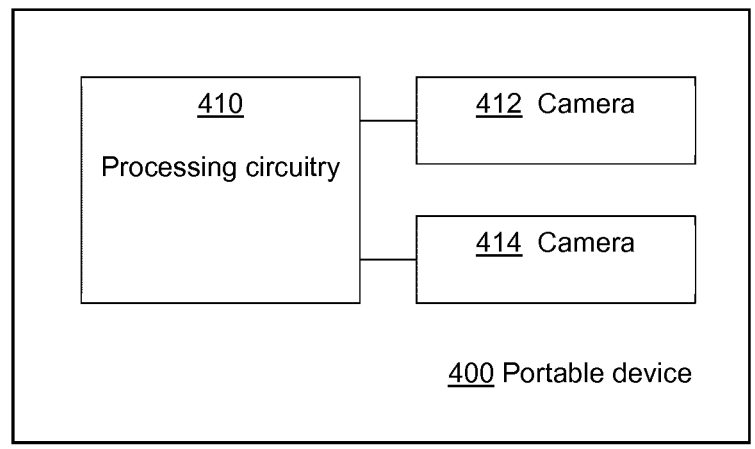
FIGS. 4 to 6 are block diagrams illustrating mobile devices according to embodiments of the invention.

Referring to FIG. 4, an embodiment of the invention provides a portable device 400 comprising a first camera 412, a second camera 414 and processing circuitry 410. The processing circuitry is configured to cause the portable device to perform the steps of the method of controlling a portable device, as described above.

Figure 5:
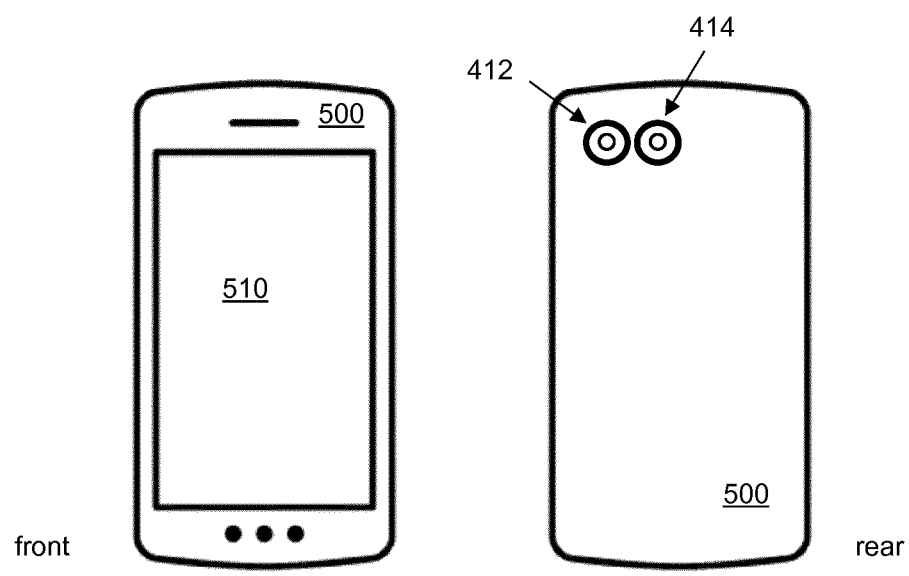
Figure 6:
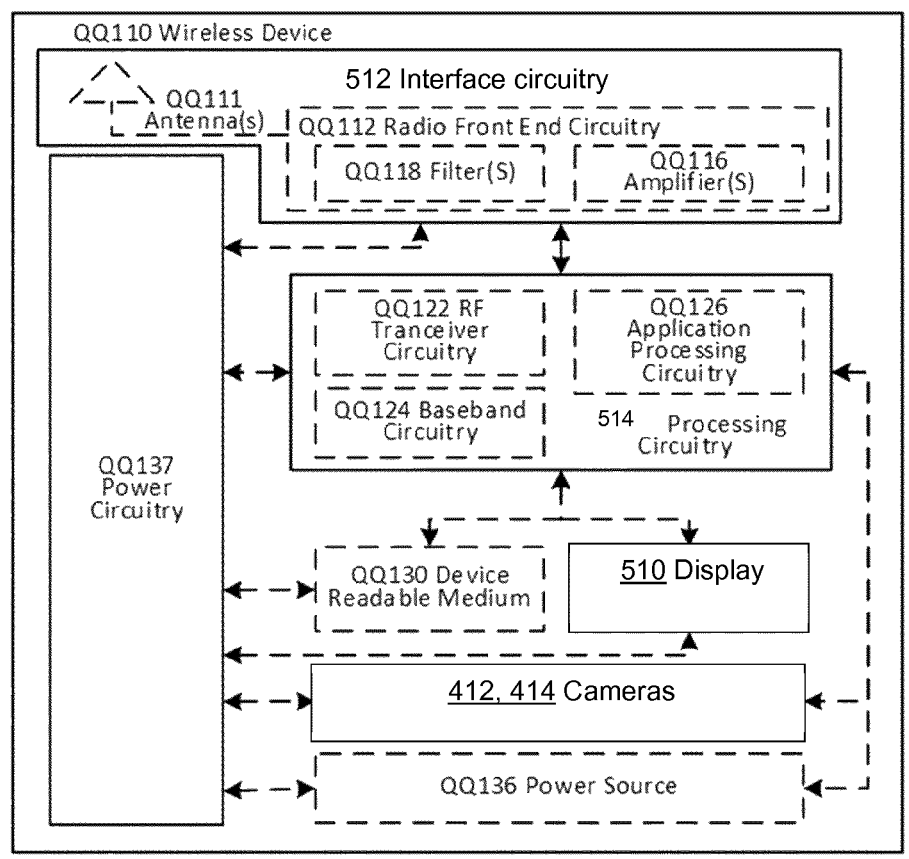

The portable device 400 may be any one of a computing device, a smart phone 500, as illustrated in FIG. 5, a wireless device QQ110, as illustrated in FIG. 6, a portable phone, a cell phone, a wireless camera, a gaming console or device, a tablet, a laptop, a head-mounted device, a navigation device and a robotic device.

In an embodiment, the portable device is a smart phone 500 and further comprises a display 510. The cameras 412, 414 are rear-facing cameras. The processing circuitry 410 is configured to generate a control signal configured to cause the images captured by the visualization camera to be displayed on the display. The control signal may also be configured to cause virtual content to be displayed with the images.

Referring to FIG. 6, an embodiment of the invention provides a portable device QQ110 comprising a first camera, 412, a second camera 414, a display 510, interface circuitry 512 and processing circuitry 512. The processing circuitry is configured to cause the portable device to cause the portable device to: select one of the first camera and the second camera as a visualization camera; initialize a localization algorithm having as an input image data representing images captured by one of the first camera and the second camera; determine a respective focus score for at least one of the first camera and the second camera; select one of the first camera and the second camera as an enabled camera based on the at least one focus score; and generate a control signal configured to cause the selected camera to be enabled. The focus score indicates a focus quality of features identified from images captured by the respective camera.

The portable device may be a wireless device, WD. The term WD refers to a device capable, configured, arranged and/or operable to communicate wirelessly with network nodes and/or other wireless devices. Unless otherwise noted, the term WD may be used interchangeably herein with user equipment, UE. Communicating wirelessly may involve transmitting and/or receiving wireless signals using electromagnetic waves, radio waves, infrared waves, and/or other types of signals suitable for conveying information through air. In some embodiments, a WD may be configured to transmit and/or receive information without direct human interaction. For instance, a WD may be designed to transmit information to a network on a predetermined schedule, when triggered by an internal or external event, or in response to requests from the network. Examples of a WD include, but are not limited to, a computing device, a smart phone 700 (as illustrated in FIG. 6), a portable phone, a cell phone, a wireless camera, a gaming console or device, a tablet, a laptop, a head-mounted device, a navigation device and a robotic device.

As illustrated, portable device QQ110 includes antenna QQ111, interface circuitry 512, processing circuitry 514, device readable medium QQ130, user interface equipment QQ132, a first camera 412, a second camera 414, power source QQ136 and power circuitry QQ137. Portable device QQ110 may include multiple sets of one or more of the illustrated components for different wireless technologies supported by portable device QQ110, such as, for example, GSM, WCDMA, LTE, NR, Wi-Fi, WiMAX, or Bluetooth wireless technologies, just to mention a few. These wireless technologies may be integrated into the same or different chips or set of chips as other components within portable device QQ110.

Antenna QQ111 may include one or more antennas or antenna arrays, configured to send and/or receive wireless signals, and is connected to interface circuitry 512. In certain alternative embodiments, antenna QQ111 may be separate from portable device QQ110 and be connectable to portable device QQ110 through an interface or port. Antenna QQ111, interface circuitry 512, and/or processing circuitry 514 may be configured to perform any receiving or transmitting operations described herein as being performed by a WD. Any information, data and/or signals may be received from a network node and/or another WD. In some embodiments, radio front end circuitry and/or antenna QQ111 may be considered an interface.

As illustrated, interface circuitry 512 comprises radio front end circuitry QQ112 and antenna QQ111. Radio front end circuitry QQ112 comprise one or more filters QQ118 and amplifiers QQ116. Radio front end circuitry QQ114 is connected to antenna QQ111 and processing circuitry 514 and is configured to condition signals communicated between antenna QQ111 and processing circuitry 514. Radio front end circuitry QQ112 may be coupled to or a part of antenna QQ111. In some embodiments, WD QQ110 may not include separate radio front end circuitry QQ112; rather, processing circuitry 514 may comprise radio front end circuitry and may be connected to antenna QQ111. Similarly, in some embodiments, some or all of RF transceiver circuitry QQ122 may be considered a part of interface circuitry 512. Radio front end circuitry QQ112 may receive digital data that is to be sent out to other network nodes or WDs via a wireless connection. Radio front end circuitry QQ112 may convert the digital data into a radio signal having the appropriate channel and bandwidth parameters using a combination of filters QQ118 and/or amplifiers QQ116. The radio signal may then be transmitted via antenna QQ111. Similarly, when receiving data, antenna QQ111 may collect radio signals which are then converted into digital data by radio front end circuitry QQ112. The digital data may be passed to processing circuitry 514. In other embodiments, the interface may comprise different components and/or different combinations of components.

Processing circuitry 514 may comprise a combination of one or more of a microprocessor, controller, microcontroller, central processing unit, digital signal processor, application-specific integrated circuit, field programmable gate array, or any other suitable computing device, resource, or combination of hardware, software, and/or encoded logic operable to provide, either alone or in conjunction with other portable device QQ110 components, such as device readable medium QQ130, portable device QQ110 functionality. Such functionality may include providing any of the various wireless features or benefits discussed herein. For example, processing circuitry 514 may execute instructions stored in device readable medium QQ130 or in memory within processing circuitry 514 to provide the functionality disclosed herein.

As illustrated, processing circuitry 514 includes one or more of RF transceiver circuitry QQ122, baseband processing circuitry QQ124, and application processing circuitry QQ126. In other embodiments, the processing circuitry may comprise different components and/or different combinations of components. In certain embodiments processing circuitry 514 of portable device QQ110 may comprise a SOC. In some embodiments, RF transceiver circuitry QQ122, baseband processing circuitry QQ124, and application processing circuitry QQ126 may be on separate chips or sets of chips. In alternative embodiments, part or all of baseband processing circuitry QQ124 and application processing circuitry QQ126 may be combined into one chip or set of chips, and RF transceiver circuitry QQ122 may be on a separate chip or set of chips. In still alternative embodiments, part or all of RF transceiver circuitry QQ122 and baseband processing circuitry QQ124 may be on the same chip or set of chips, and application processing circuitry QQ126 may be on a separate chip or set of chips. In yet other alternative embodiments, part or all of RF transceiver circuitry QQ122, baseband processing circuitry QQ124, and application processing circuitry QQ126 may be combined in the same chip or set of chips. In some embodiments, RF transceiver circuitry QQ122 may be a part of interface circuitry 512. RF transceiver circuitry QQ122 may condition RF signals for processing circuitry 514.

In certain embodiments, some or all of the functionality described herein as being performed by a WD may be provided by processing circuitry 514 executing instructions stored on device readable medium QQ130, which in certain embodiments may be a computer-readable storage medium. In alternative embodiments, some or all of the functionality may be provided by processing circuitry 514 without executing instructions stored on a separate or discrete device readable storage medium, such as in a hard-wired manner. In any of those particular embodiments, whether executing instructions stored on a device readable storage medium or not, processing circuitry 514 can be configured to perform the described functionality. The benefits provided by such functionality are not limited to processing circuitry 514 alone or to other components of portable device QQ110 but are enjoyed by portable device QQ110 as a whole, and/or by end users and the wireless network generally.

Processing circuitry 514 may be configured to perform any determining, calculating, or similar operations (e.g., certain obtaining operations) described herein as being performed by a WD. These operations, as performed by processing circuitry 514, may include processing information obtained by processing circuitry 514 by, for example, converting the obtained information into other information, comparing the obtained information or converted information to information stored by portable device QQ110, and/or performing one or more operations based on the obtained information or converted information, and as a result of said processing making a determination.

Device readable medium QQ130 may be operable to store a computer program, software, an application including one or more of logic, rules, code, tables, etc. and/or other instructions capable of being executed by processing circuitry 514. Device readable medium QQ130 may include computer memory (e.g., Random Access Memory (RAM) or Read Only Memory (ROM)), mass storage media (e.g., a hard disk), removable storage media (e.g., a Compact Disk (CD) or a Digital Video Disk (DVD)), and/or any other volatile or non-volatile, non-transitory device readable and/or computer executable memory devices that store information, data, and/or instructions that may be used by processing circuitry 514. In some embodiments, processing circuitry 514 and device readable medium QQ130 may be considered to be integrated.

User interface equipment QQ132 may provide components that allow for a human user to interact with portable device QQ110. The user interface equipment comprises a display configured to display images captured by the camera and virtual content provided by the processing circuitry. Such interaction may be of many forms, such as visual, audial, tactile, etc. User interface equipment QQ132 may be operable to produce output to the user and to allow the user to provide input to portable device QQ110. The type of interaction may vary depending on the type of user interface equipment QQ132 installed in portable device QQ110. For example, if portable device QQ110 is a smart phone, the user interface equipment comprises a touch display. display User interface equipment QQ132 is configured to allow input of information into portable device QQ110 and is connected to processing circuitry 514 to allow processing circuitry 514 to process the input information. User interface equipment QQ132 is also configured to allow output of information from portable device QQ110, and to allow processing circuitry 514 to output information from portable device QQ110. User interface equipment QQ132 may include, for example, a speaker, a display, vibrating circuitry, a USB port, a headphone interface, or other output circuitry. Using one or more input and output interfaces, devices, and circuits, of user interface equipment QQ132, portable device QQ110 may communicate with end users and/or the wireless network and allow them to benefit from the functionality described herein.

The first and second cameras 412, 414 are operable to provide image data representing images captured by the respective camera.

Power source QQ136 may, in some embodiments, be in the form of a battery or battery pack. Other types of power sources, such as an external power source (e.g., an electricity outlet), photovoltaic devices or power cells, may also be used. portable device QQ110 may further comprise power circuitry QQ137 for delivering power from power source QQ136 to the various parts of portable device QQ110 which need power from power source QQ136 to carry out any functionality described or indicated herein. Power circuitry QQ137 may in certain embodiments comprise power management circuitry. Power circuitry QQ137 may additionally or alternatively be operable to receive power from an external power source; in which case portable device QQ110 may be connectable to the external power source (such as an electricity outlet) via input circuitry or an interface such as an electrical power cable. Power circuitry QQ137 may also in certain embodiments be operable to deliver power from an external power source to power source QQ136. This may be, for example, for the charging of power source QQ136. Power circuitry QQ137 may perform any formatting, converting, or other modification to the power from power source QQ136 to make the power suitable for the respective components of portable device QQ110 to which power is supplied.

Figure 7:
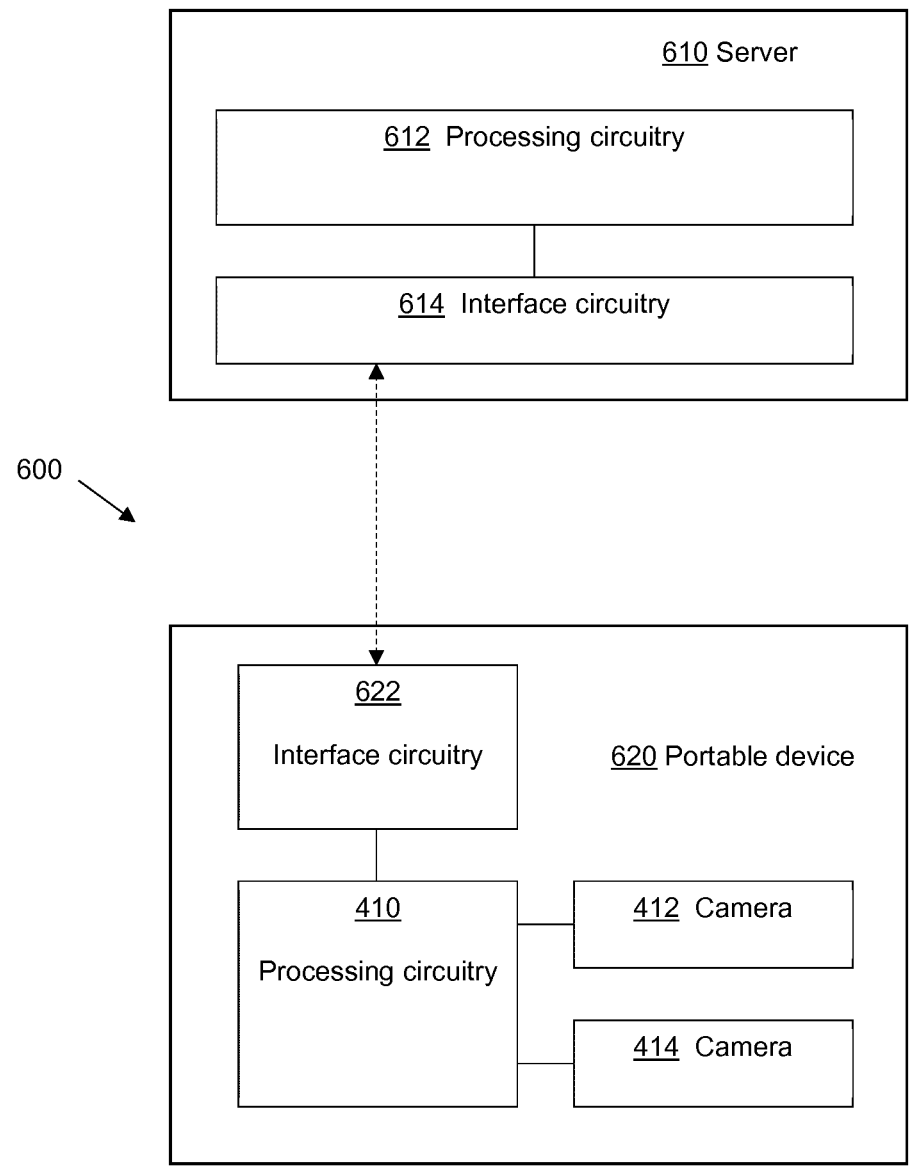
FIG. 7 is a block diagram illustrating a system according to an embodiment of the invention.

Referring to FIG. 7, an embodiment of the invention provides a system 600 comprising a server 610 and a portable device 620. The server comprises processing circuitry 612 and interface circuitry 614. The portable device comprises a first camera 412, a second camera 414, processing circuitry 410 and interface circuitry 622. The first camera and the second camera face in the same direction. The processing circuitry of the server and the processing circuitry of the portable device are together configured to cause the system to: select one of the first camera and the second camera as a visualization camera; initialize a localization algorithm having as an input image data representing images captured by one of the first camera and the second camera; determine a respective focus score for at least one of the first camera and the second camera; select one of the first camera and the second camera as an enabled camera based on the at least one focus score; and generate a control signal configured to cause the selected camera to be enabled. The focus score indicates a focus quality of features identified from images captured by the respective camera.

The system 600 is configured to perform the method 100, 200, 300 of controlling a portable device described above. All of the steps of the method may be performed by the processing circuitry 612 of the server 610 or some of the steps may be performed by the processing circuitry of the server and the rest of the steps by the processing circuitry 410 of the portable device 620.

An embodiment of the invention provides a computer program, comprising instructions which, when executed on at least one processor, cause the at least one processor to carry out any of the above steps of the method of controlling a portable device.

An embodiment of the invention provides a data carrier having computer readable instructions embodied therein. The said computer readable instructions are for providing access to resources available on a processor. The computer readable instructions comprise instructions to cause the processor to perform any of the above steps of the method of controlling a portable device.

In an embodiment, the data carrier is a non-transitory data carrier.

The invention claimed is:

1. A method of controlling a portable device comprising a first camera and a second camera facing in the same direction, the method comprising:
    selecting either of the first camera or the second camera as a localization camera to use for providing video input to a localization algorithm executed by the portable device for determining a position and/or orientation of the portable device in a surrounding three-dimensional space;
    selecting either the first camera or the second camera as a visualization camera to use for providing video input to a mixed reality (MR) visualization that depends upon the position and/or orientation of the portable device, wherein the localization camera and the visualization camera may or may not be the same camera;
    determining respective localization focus scores for the first and second cameras, each localizations focus score indicating a focus quality of the corresponding camera with respect to performance of the localization algorithm; and
    changing which camera is selected as the localization camera, based on the respective localization focus scores.

2. The method as claimed in claim 1, wherein selecting either the first camera or the second camera as the visualization camera includes initially selecting the camera not initially selected as the localization camera.

3. The method as claimed in claim 1, wherein changing which camera is selected as the localization camera comprises an ongoing process of switching between the first camera and the second camera as the localization camera, in dependence on periodic or triggered comparisons of the respective localization focus scores.

4. The method as claimed in claim 2, further comprising, subsequent to any instance of changing which camera is selected as the localization camera, changing a focus of the immediately prior localization camera to improve the focus quality of the immediately prior localization camera with respect to performance of the localization algorithm.

5. The method as claimed in claim 2, further comprising:
    generating a control signal configured to cause the images captured by the visualization camera to be displayed on a display of the portable device;
    determining a visualization focus score for the visualization camera, indicating a focus quality of the visualization camera with respect to the MR visualization; and
    changing which camera is selected as the visualization camera, based on the visualization focus score.

6. The method as claimed in claim 1, wherein the localization algorithm is a Successive Localization and Mapping (SLAM) algorithm.

7. The method as claimed in claim 1, wherein determining the respective localization focus scores for the first and second cameras comprises, for the visualization camera, determining the localization focus score in dependence on a visualization focus score determined for the visualization camera, the visualization focus score indicating a focus quality of the visualization camera with respect to the MR visualization.

8. The method as claimed in claim 1, wherein determining the respective localization focus scores for the first and second cameras comprises determining the localization focus score of each camera periodically, at the same rate.

9. The method as claimed in claim 1, wherein determining the respective localization focus scores for the first and second cameras comprises periodically determining the localization focus score of the localization camera and, responsive to determining that the localization focus score of the localization camera is below a focus score acceptability threshold, determining the localization focus score of the other camera, for comparison to the localization focus score of the localization camera.

10. The method as claimed in claim 1, wherein neither camera is designated as a preferred camera, and wherein changing which camera is selected as the localization camera comprises changing in response to the localization focus score of the camera not currently selected as the localization camera being better than the localization score of the camera that is currently selected as the localization camera.

11. The method as claimed in claim 1, wherein one of the first camera and the second camera is a preferred camera and wherein changing which camera is selected as the localization camera comprises:
    if the camera currently selected as the localization camera is not the preferred camera, changing to the preferred camera as the localization camera in response to the localization focus score of the preferred camera exceeding the localization focus score of the camera currently selected as the localization camera; or
    if the camera currently selected as the localization camera is the preferred camera, changing to the other camera as the localization camera in response to the preferred camera having a localization focus score below a lower threshold and the other camera having a comparatively better localization focus score.

12. The method as claimed in claim 1, wherein one of the first camera and the second camera has a fixed focus and the focus of the other one of the first camera and the second camera can be changed.

13. A system comprising a server and a portable device, the server comprising:
- processing circuitry; and
- interface circuitry;

and the portable device comprising:
- a first camera and a second camera, the first camera and the second camera facing in the same direction;
- processing circuitry; and
- interface circuitry, wherein the processing circuitry of the server and the processing circuitry of the portable device are together configured to cause the system to:
- select either the first camera or the second camera as a localization camera to use for providing video input to a localization algorithm executed by the portable device for determining a position and/or orientation of the portable device in a surrounding three-dimensional space;
- select either the first camera or the second camera as a visualization camera to use for providing video input to a mixed reality (MR) visualization that depends upon the position and/or orientation of the portable device, wherein the localization camera and the visualization camera may or may not be the same camera;
- determine respective localization focus scores for the first and second cameras, each localization focus score indicating a focus quality of the corresponding camera with respect to performance of the localization algorithm; and
- change which camera is selected as the localization camera, based on the respective localization focus scores.

14. A portable device comprising:
- a first camera and a second camera, the first camera and the second camera facing in the same direction;
- interface circuitry; and
- processing circuitry configured to cause the mobile device to:
  - select either the first camera or the second camera as a localization camera to use for providing video input to a localization algorithm executed by the portable device for determining a position and/or orientation of the portable device in a surrounding three-dimensional space;
  - select either the first camera or the second camera as a visualization camera to use for providing video input to a mixed reality (MR) visualization that depends upon the position and/or orientation of the portable device, wherein the localization camera and the visualization camera may or may not be the same camera;
  - determine respective localization focus scores for the first and second cameras, each localization focus score indicating a focus quality of the corresponding camera with respect to performance of the localization algorithm; and
  - change which camera is selected as the localization camera, based on the respective localization focus scores.

* * * * *